US009811530B1

(12) United States Patent
Bent et al.

(10) Patent No.: US 9,811,530 B1
(45) Date of Patent: Nov. 7, 2017

(54) CLUSTER FILE SYSTEM WITH METADATA SERVER FOR STORAGE OF PARALLEL LOG STRUCTURED FILE SYSTEM METADATA FOR A SHARED FILE

(71) Applicant: EMC IP Holding Company LLC, Hopkinton, MA (US)

(72) Inventors: John M. Bent, Los Alamos, NM (US); Sorin Faibish, Newton, MA (US); Uday Gupta, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 13/931,833

(22) Filed: Jun. 29, 2013

(51) Int. Cl.
*G06F 17/30* (2006.01)
(52) U.S. Cl.
CPC .............................. *G06F 17/30194* (2013.01)
(58) Field of Classification Search
CPC ......... G06F 17/30182; G06F 17/30194; G06F 17/30224; G06F 17/30091
See application file for complete search history.

(56) References Cited

U.S. PATENT DOCUMENTS

| | | | |
|---|---|---|---|
| 7,979,641 B2* | 7/2011 | He et al. | 711/129 |
| 2006/0031230 A1* | 2/2006 | Kumar | G06F 17/30194 707/999.01 |
| 2006/0101025 A1* | 5/2006 | Tichy et al. | 707/100 |
| 2011/0289049 A1* | 11/2011 | Zeng et al. | 707/611 |
| 2011/0296422 A1* | 12/2011 | Hildebrand et al. | 718/102 |
| 2012/0310892 A1* | 12/2012 | Dam et al. | 707/659 |
| 2013/0159364 A1* | 6/2013 | Grider | G06F 17/30224 707/826 |
| 2013/0227194 A1 | 8/2013 | Kannan et al. | |
| 2014/0025770 A1* | 1/2014 | Warfield | G06F 17/30094 709/213 |

OTHER PUBLICATIONS

Bent et al., "PLFS: A Checkpoint Filesystem for Parallel Applications," Nov. 14-20, 2009, Los Alamos National Laboratory.*

* cited by examiner

*Primary Examiner* — Phuong Thao Cao
*Assistant Examiner* — Jedidiah Ferrer
(74) *Attorney, Agent, or Firm* — Ryan, Mason & Lewis, LLP (57) ABSTRACT

Data from a group of distributed processes to a shared file is written using a parallel log-structured file system. A metadata server of a cluster file system is configured to communicate with a plurality of object storage servers of the cluster file system over a network. The metadata server further configured to implement a Parallel Log Structured File System (PLFS) library to coordinate storage on one or more of the plurality of object storage servers of a plurality of portions of a shared file generated by a plurality of applications executing on compute nodes of the cluster file system and to store metadata for the plurality of portions of the shared file. Concurrent writes to the shared file are decoupled by writing the plurality of portions of the shared file generated by each of the plurality of applications to independent write streams for each application. The metadata server communicates with a plurality of applications executing on the compute nodes over the network to process metadata requests from the applications.

21 Claims, 6 Drawing Sheets

```
// Section 410: lookup metadata info routine
getattr(object o, struct stat *buf) {
        // no traffic necessary to the OSS as might be with PLFS in OSS!
        // just use existing Lustre metadata routines
        // not much modified from existing lustre
}

// Section 420: lookup data map
// when a client wants to access a lustre file, it asks lustre MDS for a map
getmap(object o, bool read_write) {
        if (read_write == READ) {
                // maintain a small additional amount of indirection
                // in normal lustre, clients write to shared OSS objects so a
                // typical lustre file will be striped across a set of OSSs in
                // which each has only one object for that file
                // here, each OSS may have multiple objects for a file
                // maintain a bit more metadata about each
                // logical file
                // so the map that is returned may be much larger,
                // not necessarily block
                // aligned and each byte region may have a different object ID
                // also modify the client to deal with this (FIG. 5)
        } else {
                // for write, this is where the difference is on MDS
                // for each client, return a simple map that shows ALL data
                // going to a single, unique, object on a single OSS.
                // In this way, each client has its own decoupled stream.
                // Also tell the client the parent object id to use when it closes

```
// when a client stops writing to a file, it needs to send to the MDS a list
// of which byte ranges it wrote
// it was told the parent object id when it got the map
close_for_write(parent_object p, child_object o, list l) {
    // a persistent data structure stores enhanced maps
    // that contain an additional level of indirection
    // this data structure already exists and is the basic layout
    // metadata for each object.
    // the metadata is enhanced to include a set of object IDs
    // on the OSSs. Now into that structure (located using the
    // parent_object), is stored the range of bytes that were written to
    // the child_object. Other clients also send their lists and
    // these become the map that is sent to clients when they open for
    // read. Each list looks essentially like a standard PLFS index log.

// to make things faster, objects being
    // simultaneously opened for READ and WRITE are disabled
~
```

450

```
// for a read, it's basically the same except that the map that was
// returned on open is more complex since it has arbitrary byte ranges
// which might be unaligned and may access multiple objects on each OSS
read(file f, len_t len, off_t off, char *buf) {
    /// This invention will allow the OSS 104 to be unmodified and will
    /// encapsulate all changes in the MDS 308 and the clients on compute nodes 250

/// lookup each targeted byte range in the map
    /// each one may be in a different object on that OSS 104 in a different object on that OSS 104
    /// read each.
    /// This is substantially similar to how read is implemented in PLFS container
    /// mode with corresponding optimizations for caching object handles
    /// See:
    /// https://github.com/plfs/plfs-core/blob/2.4/src/LogicalFS/PLFSIndex.cpp
}

// for a write, it's actually identical except that we have to log all of
// them so we can send them in a batch to the MDS when the file is closed
write(file f, len_t, off_t off, const char *buf) {
    /// do normal write
    /// also log this byte range
    /// then on the close, send the log to the MDS
    /// if we wanted to support read-write mode, we could send the byte-range
    /// info to the MDS on every write (or periodically) but that would
    /// impair write performance
}
```

FIG. 5

CLUSTER FILE SYSTEM WITH METADATA SERVER FOR STORAGE OF PARALLEL LOG STRUCTURED FILE SYSTEM METADATA FOR A SHARED FILE

FIELD

The field relates generally to data storage and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In many parallel computing applications, including cluster file systems, a group of distributed processes must often write data to a shared file. When multiple processes attempt to write data to a shared file concurrently, however, the performance of the parallel storage system will be impaired. Serialization can cause significant performance degradation as the parallel processes must remain idle while they wait for one another. Serialization is incurred when the parallel file system locks a shared file in order to maintain the consistency of the shared file.

A number of techniques have been proposed or suggested to organize the data streams when multiple processes simultaneously save data to a shared file. For example, each process can create a single file across a set of different directories and then sequentially write a large amount of data to the single file. In a further implementation, a single process (often referred to as a "leader") can create a shared file, and then all the processes write to the shared file in segments that are aligned with block boundaries within the parallel file system.

A need therefore exists for improved techniques for writing data from a group of distributed processes to a shared file in a cluster file system.

SUMMARY

Embodiments of the present invention provide improved techniques for writing data from a group of distributed processes to a shared file using a parallel log-structured file system. In one embodiment, a metadata server of a cluster file system is configured to communicate with a plurality of object storage servers of the cluster file system over a network. The metadata server further configured to implement a Parallel Log Structured File System (PLFS) library to coordinate storage on one or more of the plurality of object storage servers of a plurality of portions of a shared file generated by a plurality of applications executing on compute nodes of the cluster file system and to store metadata for the plurality of portions of the shared file.

According to a further aspect of the invention, concurrent writes to the shared file are decoupled by writing the plurality of portions of the shared file generated by each of the plurality of applications to independent write streams for each application. The metadata server is further configured to communicate with a plurality of applications executing on the compute nodes over the network and to process metadata requests from the applications.

Advantageously, illustrative embodiments of the invention write data from a group of distributed processes to a shared file using a parallel log-structured file system. Write operations in accordance with aspects of the present invention reduce data processing and transfer bandwidth costs and preserve valuable disk space.

These and other features and advantages of the present invention will become more readily apparent from the accompanying drawings and the following detailed description.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

Figure 1:
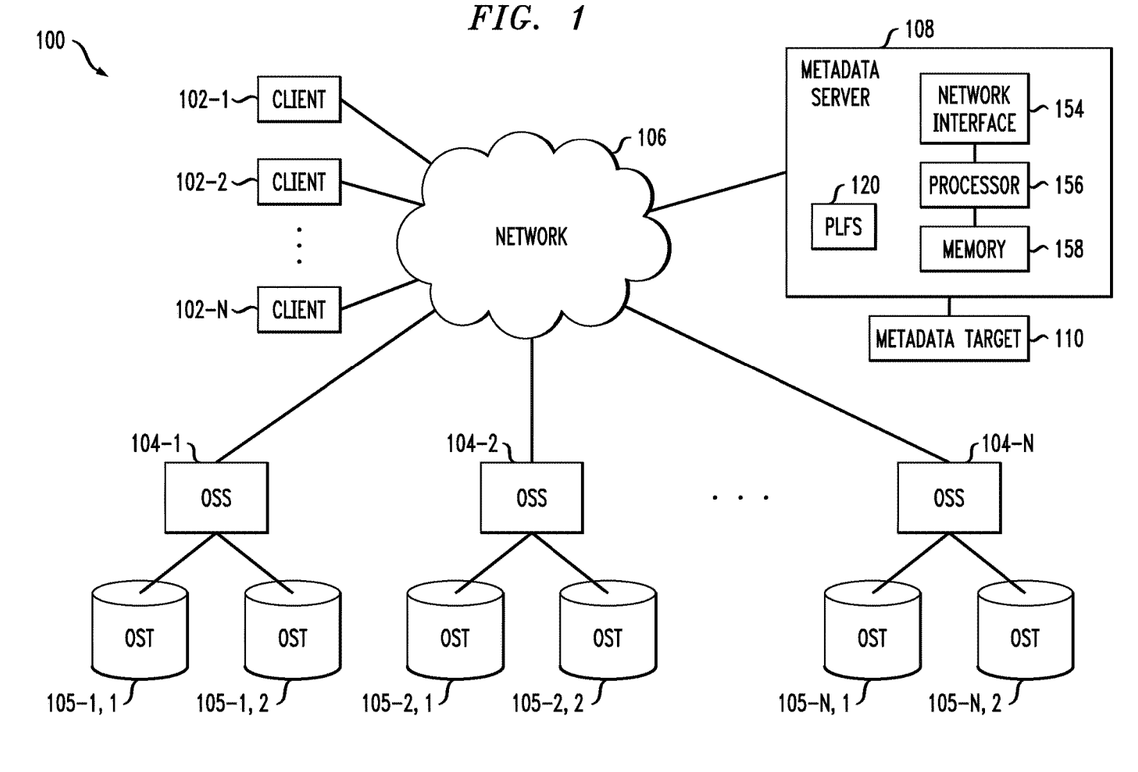
FIG. 1 is a block diagram of a cluster file system in an illustrative embodiment of the invention.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, ... 102-N, and object storage servers denoted 104-1 through 104-N. Each of the object storage servers 104 has one or more corresponding storage devices 105 which may comprise a storage array or other type of storage device. Thus, the exemplary object storage servers 104-1 through 104-N have associated exemplary storage devices 105-1,1 and 105-1, 2 through 105-N, 1 and 105-N, 2, respectively. The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

The metadata server 108 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the metadata server 108 is network interface circuitry 154. The network interface circuitry 154 allows the metadata server 108 to communicate over the network 106 with the clients 102 and object storage servers 104. The network interface circuitry 154 may comprise, for example, one or more conventional transceivers.

The metadata server 108 further comprises a parallel log-structured file system (PLFS) 120, as discussed further below in conjunction with FIG. 3. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

Storage arrays utilized in the cluster file system 100 may comprise, for example, storage products such as VNX and Symmetrix VMAX™, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 may optionally be arranged into a plurality of storage tiers, in a known manner. As noted above, each of the storage devices 105 may be viewed as being representative of an object storage target of the corresponding one of the object storage servers 104.

The client 102 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

Also, although two object storage targets 105 are associated with each object storage server 104 in the FIG. 1 embodiment, other embodiments may associate a different number of object storage targets with each object storage server.

The metadata server 108 comprising processor 156, memory 158 and network interface 154 as described above is an example of what is more generally referred to herein as a "processing device." Each of the clients 102 and object storage servers 104 may similarly be implemented as a processing device comprising processor, memory and network interface components.

Although only a single metadata server 108 is shown in the FIG. 1 embodiment, a given cluster file system in other embodiments may comprise multiple metadata servers 108.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system.

Figure 2:
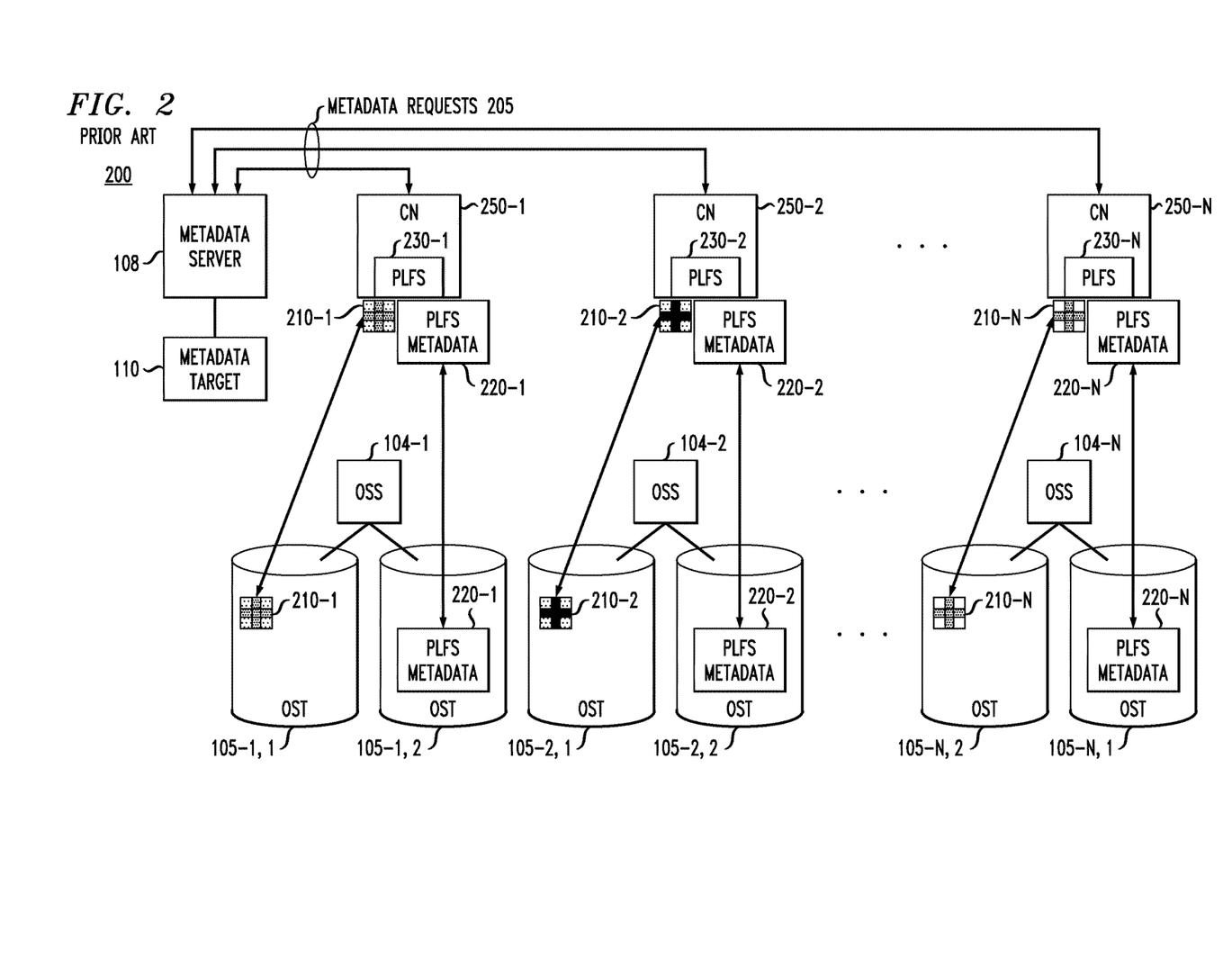
FIG. 2 is a block diagram of a conventional cluster file system with a plurality of distributed applications writing data to a shared file.

FIG. 2 illustrates a conventional cluster file system 200 with a plurality of distributed applications writing data to a shared file. As illustrated in FIG. 2, a conventional cluster file system 200 comprises a plurality of object storage servers (OSSs) 104, a plurality of object storage targets (OSTs) 105, a plurality of compute nodes (CNs) 250 having clients executing thereon and a metadata server (MDS) 108 having a corresponding metadata target (MDT) 110. The object storage servers (OSS) 104, object storage targets (OST) 105, metadata server (MDS) 108 and metadata target (MDT) 110 are optionally implemented as Lustre OSS, OST, MDS and MDT elements, respectively.

In the exemplary embodiment of FIG. 2, a given OSS 104 exposes two OSTs 105. Each of the OSTs may comprise one or more storage arrays or other types of storage devices. The total data storage capacity of the cluster file system 200 is the sum of all the individual data storage capacities represented by the OSTs 105. The compute nodes 250 can concurrently access this collective data storage capacity using data Input/Output (IO) requests directed to the OSSs 104 based on metadata obtained from the MDS 108. The IO requests and other similar requests herein may be configured, for example, in accordance with standard portable operating system interface (POSIX) system calls.

The MDS 108 utilizes the MDT 110 to provide metadata services for the cluster file system 200 in response to metadata requests 205 from the compute nodes 250. The MDT 110 stores file metadata, such as file names, directory structures, and access permissions. When an application on a compute node 250 writes to a shared file, the PLFS library 230 on the compute node 250 translates the write operation into a write to a given sub-file or data portion 210. The PLFS library 230 interacts with the exemplary Lustre file system which redirects the request as a metadata request 205. The Lustre file system treats the PLFS metadata 220 as a PLFS file and the metadata server 108 indicates where (i.e., on which OSS 104) the given sub-file or data portion 210 and corresponding PLFS metadata 220 should be stored.

Additional details regarding conventional aspects of an exemplary Lustre file system may be found in, for example, Cluster File Systems, Inc., "Lustre: A Scalable. High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein. Additional details regarding the use of PLFS on compute nodes 250 may be found in, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

A number of techniques have been proposed or suggested to organize the data streams when multiple processes on different compute nodes 250 simultaneously write data to a shared file.

In one conventional shared writing solution for cluster file systems, when clients on multiple compute nodes 250 want to write data into the same region within the same file, the metadata server 108 instructs the clients on the compute nodes 250 to send their data to the same OSS 104. Thus, clients on compute nodes 250 are sending their data to the same region of a shared file. All data goes to the same OSS 104 resulting in inefficient storage utilization and potentially locking byte ranges in shared objects which impairs performance. This solution limits parallelism. Serialization can cause significant performance degradation as the parallel processes on the compute nodes 250 must remain idle while they wait for one another. Such serialization is incurred when the parallel file system 200 locks a shared file in order to maintain the consistency of the shared file.

FIG. 2 illustrates a further conventional solution for a plurality of distributed applications writing data to a shared file. As shown in FIG. 2, each compute node 250 comprises a corresponding PLFS library 230. The PLFS library 230 reorganizes the data into multiple files portions 210-1 through 210-N. Thus, the MDS 108 can distribute the data among multiple OSSs/OSTs 104/105 and the applications on the compute nodes 250 thereby achieving full utilization of the storage system.

The PLFS library 230 also creates metadata 220-1 through 220-N associated with each corrresponding data portion 210-1 through 210-N that must be stored along with the corrresponding data portion 210-1 through 210-N. The distribution of the data portions 210-1 through 210-N and corresponding metadata 220-1 through 220-N among the OSSs 104 is probabilistic. The storage of the corresponding metadata 220-1 through 220-N on the OSSs 104 subtracts from the available bandwidth for the user data. In addition, the solution shown in FIG. 2 requires modifications on the compute nodes 250 to include the PLFS library 230 (i.e., a second layer of software).

These and other drawbacks of conventional arrangements are addressed by providing a metadata server 308 having a PLFS library 330 executing thereon (instead of on the compute nodes 250). In this manner, the bandwidth for shared files is improved.

Figure 3:
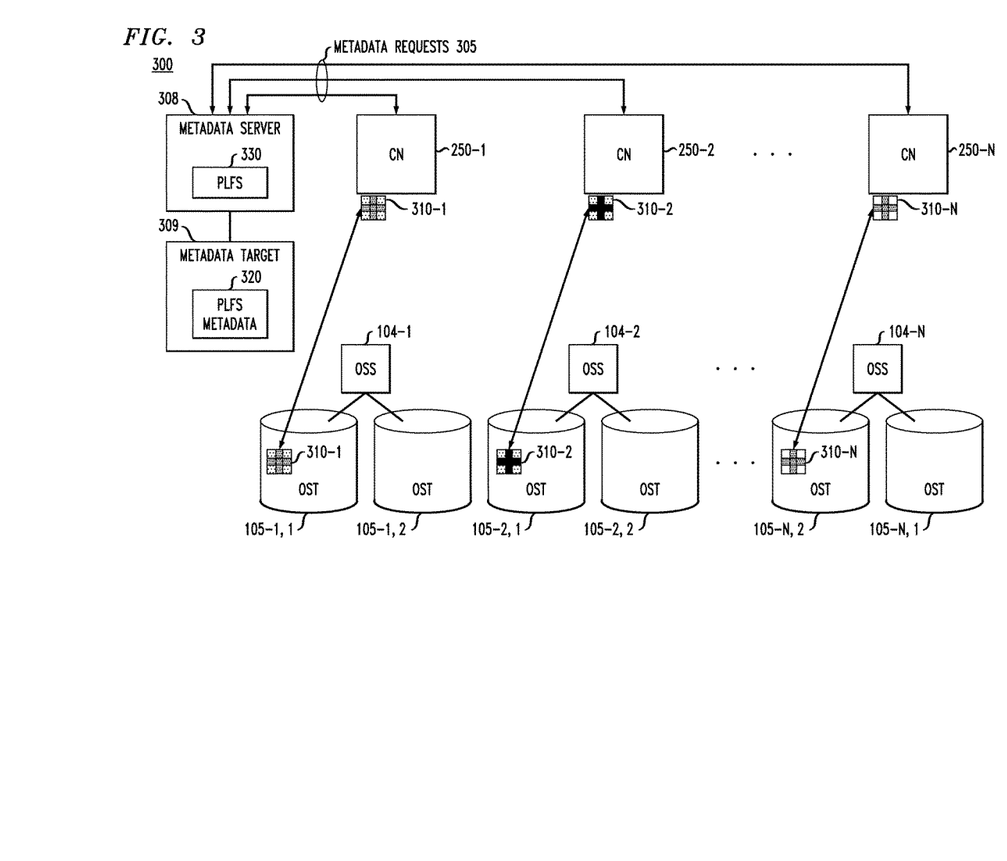
FIG. 3 is a block diagram of a cluster file system in accordance with aspects of the invention where the corresponding metadata for a plurality of data portions of a shared file is stored by the metadata server in the cluster file system of FIG. 1.

FIG. 3 illustrates a cluster file system 300 in accordance with aspects of the invention where the corresponding PLFS metadata 320 for a plurality of data portions 310-1 through 310-N of a shared file is stored by the metadata server 308 in the cluster file system 300. As will be described, such arrangements advantageously allow for more efficient storage of metadata for a shared file in a cluster file system in a manner that requires only small changes to clients and avoids the need for any significant changes to object storage servers or applications running on those devices.

It should be noted with regard to the illustrative embodiments of FIGS. 1 and 3 that relatively minor modifications may be made to one or more applications or other system elements or components in order to achieve additional improvements.

As discussed further below in conjunction with FIGS. 4A and 4B, when multiple clients on the compute nodes 250 want to write to a shared file, the PLFS library 330 will deliver a unique Object for each client to write to on one of the OSSs 104, thus parallelizing the IO.

In this manner, shared writes are decoupled, with a similar data distribution as the conventional solution of FIG. 2, without the additional overhead created by storing the PLFS metadata on the OSSs 104. Thus, among other benefits, aspects of the present invention allow a plurality of distributed applications to write to a shared file without having the PLFS metadata 320 compete for bandwidth with the user data in data portions 310. In this manner, the PLFS metadata 320 is stored on the MDT 309 of the MDS 308 and not spread across OSSs 104.

While the use of PLFS libraries 230 on compute nodes 250, as shown in FIG. 2, achieves better data distribution probabilistically, relative to prior techniques, the use of a PLFS library 330 on the MDS 308, as shown in FIG. 3, in accordance with aspects of the present invention achieves better data distribution deterministically, relative to the technique of FIG. 2. For example, the use of a PLFS library 330 on the MDS 308 achieves the same (or better) data parallelism and avoids the cost of sending metadata across the network to the OSSs 104 as well as the cost of storing metadata on the OSTs 105. Instead, the PLFS metadata 320 is stored more appropriately on the MDT 309 of the MDS 308.

Figure 4A:
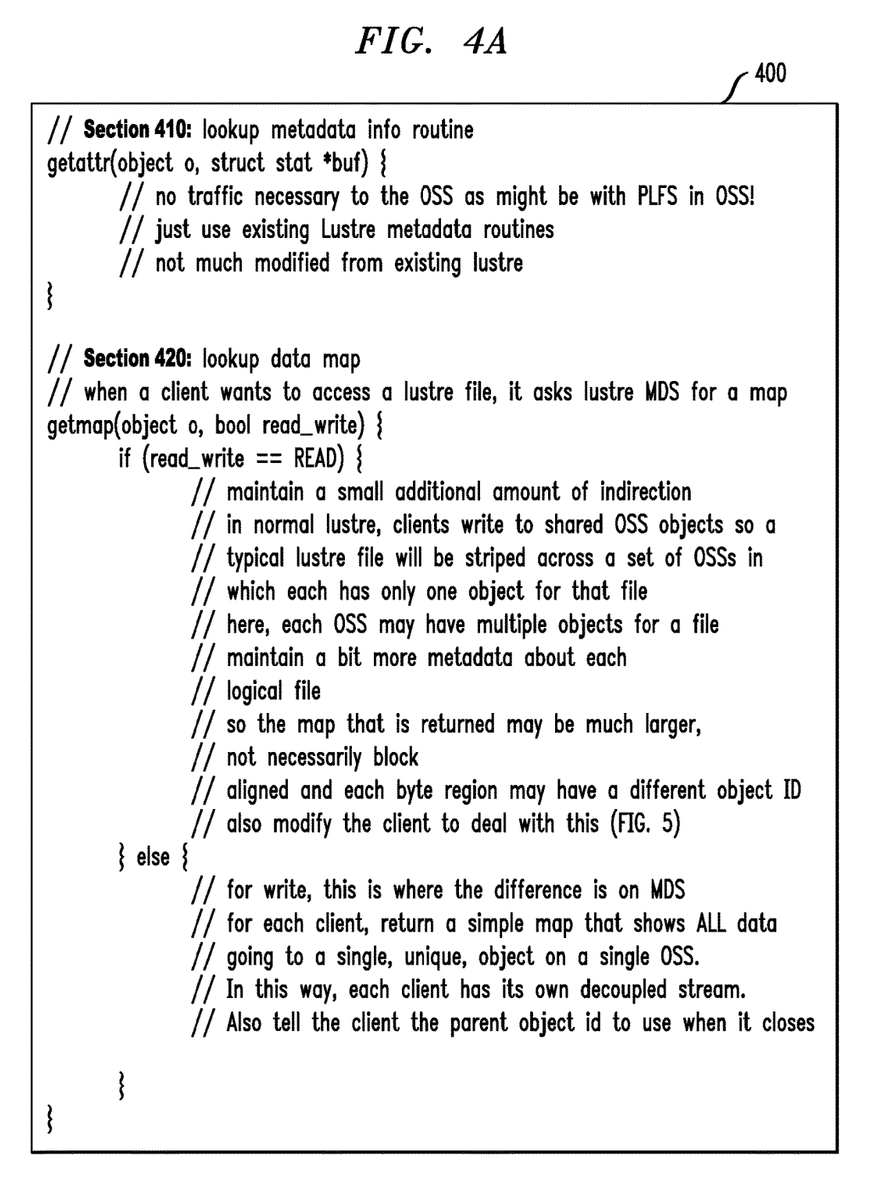
FIGS. 4A, 4B and 5 illustrate exemplary pseudo code for the metadata server of FIG. 3 and clients of FIG. 1, respectively.
Figure 4B:
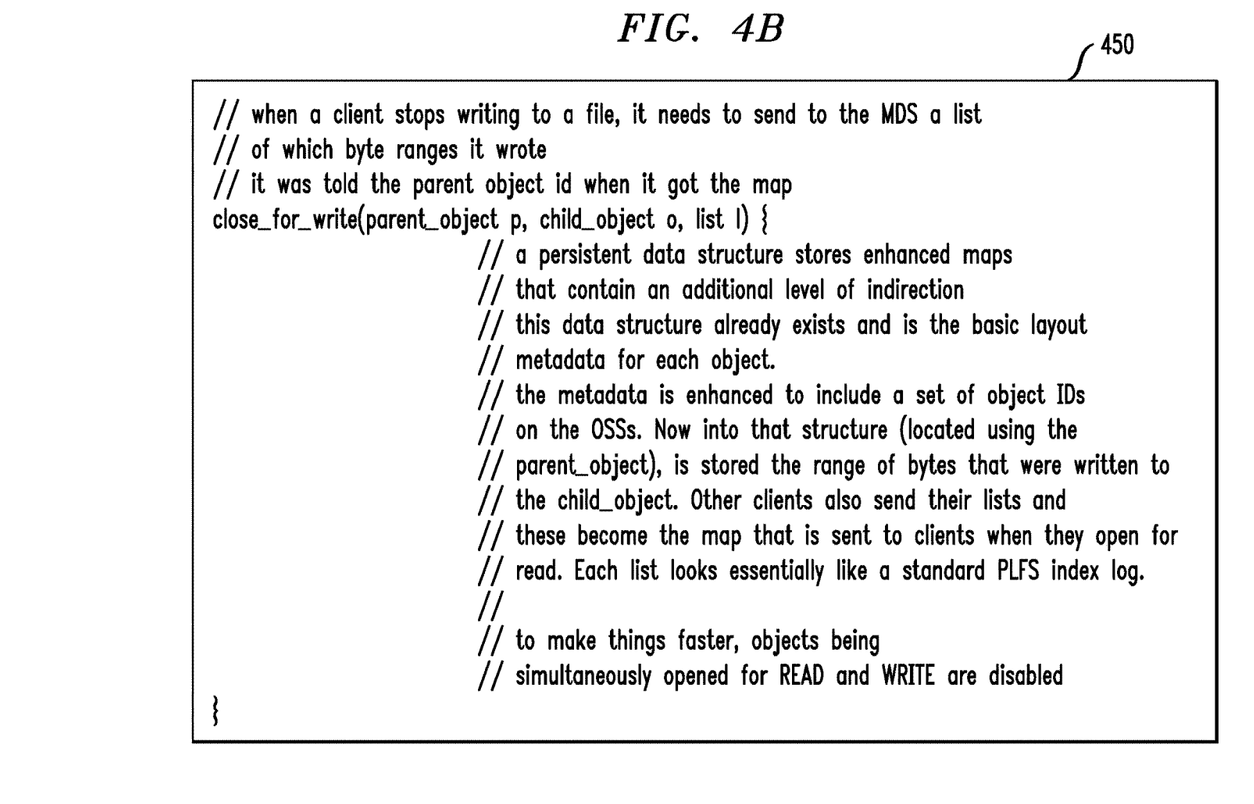

FIGS. 4A and 4B, collectively, illustrate exemplary pseudo code 400, 450 for the metadata server 308 of FIG. 3. As shown in FIG. 4A, the exemplary pseudo code 400 comprises a section 410 for looking up metadata information, primarily using conventional Lustre metadata routines. Traffic is not necessary to the OSS 104. In addition, the exemplary pseudo code 400 comprises a section 420 for looking up a data map, which is used when a client on a compute node 250 wants to access a Lustre file. In a conventional Lustre implementation, clients write to shared OSS objects so a typical Lustre file will be striped across a set of OSSs 104 in which each OSS 104 has only one object for that file.

In accordance with aspects of the present invention, for a read operation, each OSS 104 may have multiple objects for a given file. Thus, the MDS 308 maintains additional metadata about each logical file. Thus, the map that is returned by section 420 may be larger, not necessarily block aligned and each byte region may have a different object identifier. The required modifications to a client on a compute node 250 are discussed further below in conjunction with FIG. 5.

For a write operation, the MDS 308, for each client, returns a map that shows all data going to a single, unique, object on a single OSS 104. In this manner, each client has its own decoupled stream. In addition, the client is provided with the parent object identifier to use when the file is closed.

As shown in FIG. 4B, the exemplary pseudo code 450 indicates that when a client stops writing to a file, the client needs to send to the MDS 308 a list of which byte ranges were written. The list of byte ranges that were written is sent to the MDS 308 in a log structured format. As indicated above, the client was given the parent object identifier when the client got the data map.

Figure 5:
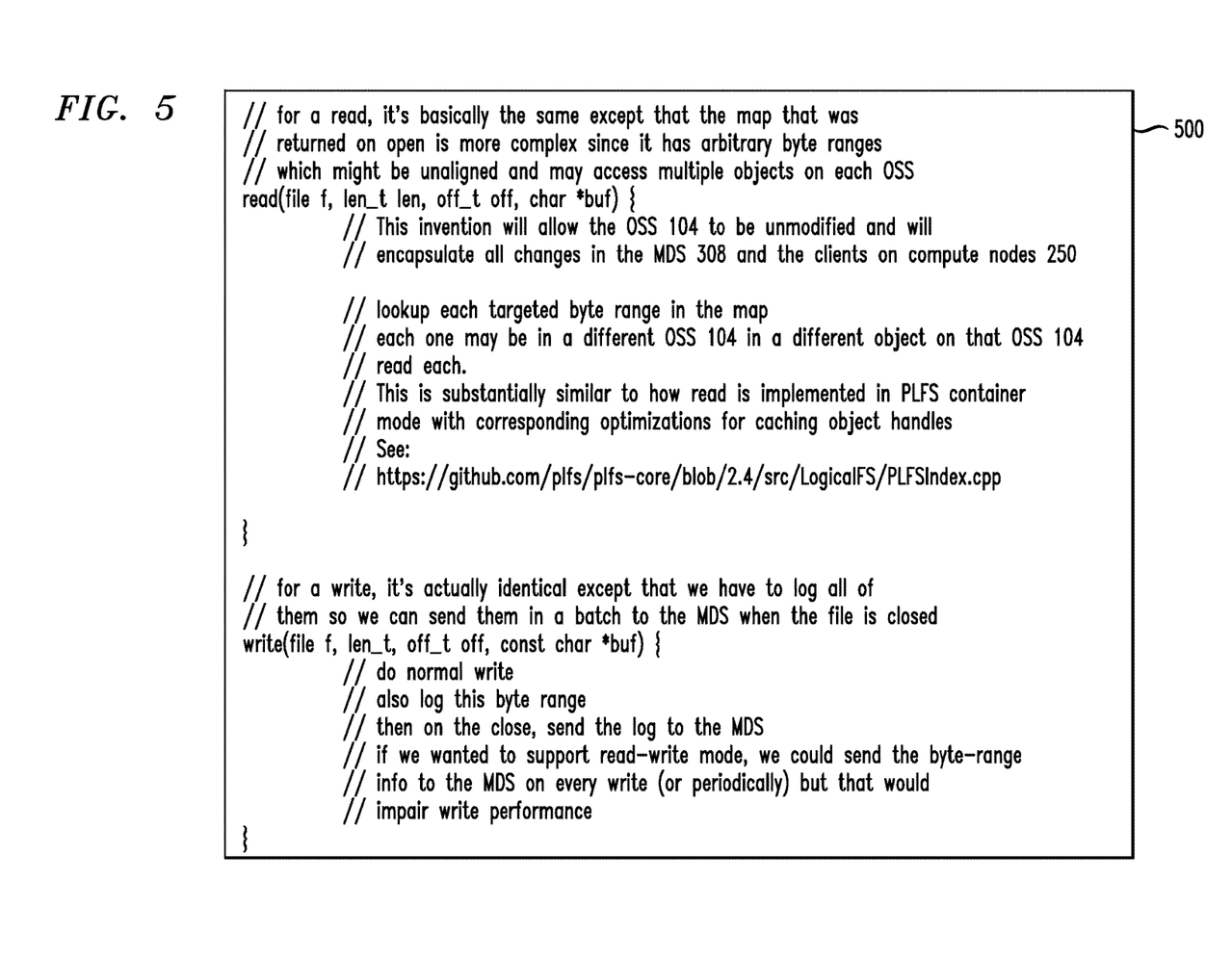

FIG. 5 illustrates exemplary pseudo code 500 for the clients of FIG. 1. As shown in FIG. 5, the pseudo code 500 for a read operation is substantially similar to a conventional Lustre implementation, except that the map that was returned on file open is somewhat more complex since the map has arbitrary byte ranges that might be unaligned and may access multiple objects on each OSS 104.

Each targeted byte range is looked up in the map. Each targeted byte range may be stored on a different OSS 104 in a different object on that OSS 104. This is substantially similar to how a read operation is implemented in a conventional PLFS container mode, with corresponding optimizations for caching object handles. See, e.g., https://github.com/plfs/plfs-core/blob/2.4/src/LogicalFS/PLFSIndex.cpp, incorporated by reference herein.

As shown in FIG. 5, the pseudo code 500 for a write operation is substantially similar to a conventional Lustre implementation, except all of the written byte ranges must be logged, so the log can be sent in a batch to the MDS 308 when the file is closed.

It is to be appreciated that the particular operations and associated messaging illustrated in FIGS. 3, 4A, 4B and 5 are exemplary only and numerous other types of operations and messaging may be used in other embodiments.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the cluster file system 100. Such components can communicate with other elements of the cluster file system 100 over any type of network or other communication media.

As indicated previously, components of a metadata server 308 as disclosed herein can be implemented at least in part in the form of one or more software programs stored in memory and executed by a processor of a processing device. A memory having such program code embodied therein is an example of what is more generally referred to herein as a "computer program product."

The cluster file systems 100 and 300 or portions thereof may be implemented using one or more processing platforms each comprising a plurality of processing devices. Each such processing device may comprise processor, memory and network interface components of the type illustrated for the metadata server 108 in FIG. 1.

As indicated above, cluster file system functionality such as that described in conjunction with FIGS. 1 through 5 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from the shared file write functionality as described herein. Also, the particular configurations of system and device elements shown in FIGS. 1 and 3 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a metadata server of a cluster file system, wherein said metadata server comprises at least one hardware processing device coupled to a memory;
the metadata server being configured to communicate with a plurality of object storage servers of the cluster file system over a network;
the metadata server further configured to implement a Parallel Log Structured File System (PLFS) library: (i) to coordinate storage on one or more of said plurality of object storage servers of a plurality of portions of a shared file generated by a plurality of clients executing on compute nodes of said cluster file system, wherein said PLFS library deterministically assigns and returns a separate unique log structured object, on a single one of said object storage servers, to each client of said plurality of clients, allowing each client of said plurality of clients to write to said assigned separate unique log structured object on said assigned single object storage server when writing to said shared file, wherein the assignment of the separate unique log structured object, on a single one of said object storage servers, to each client of said plurality of clients allows the write operations by each client of said plurality of clients to said shared file to be decoupled; and (ii) to store PLFS metadata comprising said assignment of said separate unique log structured object and said single object storage server to each client of said plurality of clients in the metadata server for said plurality of portions of said shared file, wherein requests for said PLFS metadata are processed without utilizing bandwidth of said plurality of object storage servers, wherein said PLFS metadata for a given portion maps a byte range of said portion to an identifier of the separate unique log structured object corresponding to said byte range, and wherein said PLFS metadata is sent to said metadata server in a log structured format.

2. The apparatus of claim 1 wherein the metadata server is further configured to communicate with a plurality of clients over the network and to process metadata requests from said clients.

3. The apparatus of claim 1 wherein each of the object storage servers is configured to interface with at least one object storage target.

4. The apparatus of claim 1 wherein the metadata server is configured to interface with at least one metadata target to store said metadata for said plurality of portions of said shared file.

5. The apparatus of claim 1 wherein the metadata server is configured to process one or more metadata requests from one or more of said plurality of clients executing on said compute nodes.

6. The apparatus of claim 1 wherein the cluster file system comprises a Lustre file system.

7. The apparatus of claim 1 wherein the plurality of portions of said shared file generated by each of said plurality of clients are each written to an independent write stream.

8. The apparatus of claim 1 wherein the metadata server is further configured to provide a data map indicating said separate unique log structured object on one of said plurality of object storage servers that stores data for a given client.

9. A method comprising:
configuring a metadata server of a cluster file system to communicate with a plurality of object storage servers of the cluster file system over a network; and
configuring the metadata server to implement a Parallel Log Structured File System (PLFS) library: (i) to coordinate storage on one or more of said plurality of object storage servers of a plurality of portions of a shared file generated by a plurality of clients executing on compute nodes of said cluster file system, wherein said PLFS library deterministically assigns and returns a separate unique log structured object, on a single one of said object storage servers, to each client of said plurality of clients, allowing each client of said plurality of clients to write to said assigned separate unique log structured object on said assigned single object storage server when writing to said shared file, wherein the assignment of the separate unique log structured object, on a single one of said object storage servers, to each client of said plurality of clients allows the write operations by each client of said plurality of clients to said shared file to be decoupled; and (ii) to store PLFS metadata comprising said assignment of said separate unique log structured object and said single object storage server to each client of said plurality of clients in the metadata server for said plurality of portions of said shared file, wherein requests for said PLFS metadata are processed without utilizing bandwidth of said plurality of object storage servers, wherein said PLFS metadata for a given portion maps a byte range of said portion to an identifier of the separate unique log structured object corresponding to said byte range, and wherein said PLFS metadata is sent to said metadata server in a log structured format.

10. The method of claim 9 further comprising the step of configuring the metadata server to communicate with a plurality of clients over the network and to process metadata requests from said clients.

11. The method of claim 9 wherein each of the object storage servers is configured to interface with at least one object storage target.

12. The method of claim 9 wherein the metadata server is configured to interface with at least one metadata target to store said metadata for said plurality of portions of said shared file.

13. The method of claim 9 wherein the cluster file system comprises a Lustre file system.

14. The method of claim 9 wherein the plurality of portions of said shared file generated by each of said plurality of clients are each written to an independent write stream.

15. A computer program product comprising a processor-readable storage medium having encoded therein executable code of one or more software programs, wherein the one or more software programs when executed cause the metadata server to perform the steps of the method of claim 9.

16. The method of claim 9 wherein the step of configuring the metadata server further comprises the step of configuring the metadata server to provide a data map indicating said separate unique log structured object on one of said plurality of object storage servers that stores data for a given client.

17. A cluster file system comprising:
a metadata server comprising at least one hardware processing device coupled to a memory; and
a plurality of object storage servers coupled to the metadata server via a network;
the metadata server being configured to implement a Parallel Log Structured File System (PLFS) library: (i) to coordinate storage on one or more of said plurality of object storage servers of a plurality of portions of a shared file generated by a plurality of clients executing on compute nodes of said cluster file system, wherein said PLFS library deterministically assigns and returns a separate unique log structured object, on a single one of said object storage servers, to each client of said plurality of clients, allowing each client of said plurality of clients to write to said assigned separate unique log structured object on said assigned single object storage server when writing to said shared file, wherein the assignment of the separate unique log structured object, on a single one of said object storage servers, to each client of said plurality of clients allows the write operations by each client of said plurality of clients to said shared file to be decoupled; and (ii) to store PLFS metadata comprising said assignment of said separate unique log structured object and said single object storage server to each client of said plurality of clients in the metadata server for said plurality of portions of said shared file, wherein requests for said PLFS metadata are processed without utilizing bandwidth of said plurality of object storage servers, wherein said PLFS metadata for a given portion maps a byte range of said portion to an identifier of the separate unique log structured object corresponding to said byte range, and wherein said PLFS metadata is sent to said metadata server in a log structured format.

18. The cluster file system of claim 17 wherein each of the object storage servers is configured to interface with at least one object storage target.

19. The cluster file system of claim 17 wherein the metadata server is configured to interface with at least one metadata target to store said metadata for said plurality of portions of said shared file.

20. The cluster file system of claim 17 wherein the metadata server is configured to process one or more metadata requests from one or more of said plurality of clients executing on said compute nodes.

21. The cluster file system of claim 17 wherein the cluster file system comprises a Lustre file system.

* * * * *